United States Patent [19]

Oxley

[11] 4,337,854

[45] Jul. 6, 1982

[54] PRESSURE RELEASE DEVICE FOR A TRANSMISSION BRAKE

[76] Inventor: Jerry L. Oxley, Rte. #1, Box 87, Greenfield, Iowa 50849

[21] Appl. No.: 185,343

[22] Filed: Sep. 8, 1980

[51] Int. Cl.³ .............................................. B60K 41/24
[52] U.S. Cl. .............................. 192/13 R; 192/109 F; 74/26; 188/311
[58] Field of Search .................... 192/4 A, 4 R, 13 A, 192/12 A, 13 R, 12 R, 109 F, 99 S; 74/26; 188/311, 318, 297; 267/8 R, 8 A

[56] References Cited

U.S. PATENT DOCUMENTS

| | | | |
|---|---|---|---|
| 1,975,626 | 10/1934 | Tibbetts | 192/13 R X |
| 2,215,058 | 9/1940 | Van Maren | 188/311 X |
| 2,541,112 | 2/1951 | Smith | 74/26 |
| 2,824,425 | 2/1958 | Wales | |
| 3,346,081 | 10/1967 | Rowse | 192/13 R |
| 3,430,512 | 3/1969 | Wossner | |
| 3,498,433 | 3/1970 | Lohmann | 192/99 S |
| 3,979,790 | 9/1976 | Chiarappa | 188/318 |
| 4,280,600 | 7/1981 | Salmon et al. | 188/318 X |

Primary Examiner—George H. Krizmanich
Attorney, Agent, or Firm—Morton S. Adler

[57] ABSTRACT

A clutch pedal operated rod to the brake lever in a transmission brake system for tractors and the like is formed of two spaced longitudinally aligned rod lengths connected by a coupling for transmitting force therebetween through a fluid medium. The coupling is secured to the end of one length and slidable receives a spring loaded piston head on the aligned end of the other length. The piston head is in fluid seal engagement with the coupling and separates such coupling into an upper and lower chamber with a fluid supply disposed in the upper chamber in non-operating position. A fluid conduit exteriorly of the coupling communicates with both chambers. Depression of the clutch pedal effects relative movement of the piston head against the fluid supply in the upper chamber where the fluid acts as a solid member under pressure to transmit force to the brake operating rod for stopping the transmission. The entrapped fluid under pressure from the piston head flows through the conduit at a rate controllable by an adjustable needle valve from the upper chamber to the lower chamber as the force exerted on the brake rod effects stoppage of the transmission and at the completion of such flow, the force transmitting connection between the aligned brake lever operating rod lengths is terminated by the exhaustion of the fluid supply in the upper chamber so that with the clutch pedal depressed and the transmission stopped, there is no pressure on the transmission or the gears and the gears can be easily and smoothly shifted. Release of the clutch pedal effects relative movement of the piston head away from the upper chamber towards and into the lower chamber to a predetermined degree sufficient to effect the flow of the fluid supply through the conduit back to the upper chamber for the next actuation of the brake.

11 Claims, 7 Drawing Figures

PRESSURE RELEASE DEVICE FOR A TRANSMISSION BRAKE

BACKGROUND OF THE INVENTION

This invention relates to improvements in transmission brakes such as found on tractors and the like and more particularly to apparatus for automatically releasing pressure on the transmission gear when it has stopped.

The transmission brake as found on farm tractors and the like is operated in a well known manner with a linkage system actuated by depression of the clutch pedal when disengaging the same whereby the transmission can be stopped to permit shifting of the gears. Conventionally, the linkage between the clutch pedal and the brake is an arrangement of rigid rod links so the application of force by the depression of the clutch pedal to the brake is continuous as long as such pedal remains depressed even though the transmission has stopped. Under such conditions, I have observed that there is a tendency for the gears to lock up so that it becomes difficult to shift them with ease or smoothness and release of the clutch towards engaged position to relieve pressure on the transmission only increases such difficulty.

Accordingly, with such observations in mind, it is one of the important objects of this invention to provide apparatus for a clutch pedal operated transmission brake system wherein the force necessary for actuating the brake automatically ceases when the transmission has stopped without requiring further manipulation of the clutch pedal.

More particularly, it is an object herein to provide apparatus as characterized which includes a coupling between selected components of the brake linkage system for transmitting force to the brake through a fluid medium.

SUMMARY OF THE INVENTION

In accordance with the present invention, the brake lever operating rod is formed of two spaced longitudinally aligned rod lengths connected by a coupling for transmitting force therebetween through a fluid medium. The coupling is secured to the end of one length and slidably receives a spring loaded piston head on the aligned end of the other length. The piston head is in fluid seal engagement with the coupling and separates such coupling into an upper and lower chamber with fluid disposed in the upper chamber in non-operating position. A fluid conduit exteriorly of the coupling communicates with both chambers. Depression of the clutch pedal effects relative movement of the piston head against the fluid in the upper chamber where the fluid acts as a solid member to transmit force to the brake operating rod for stopping the transmission. The entrapped fluid under pressure from the piston head flows through the conduit from the upper chamber to the lower chamber as the force exerted on the brake rod effects stoppage of the transmission and at the completion of such flow, the force transmitting capability of the fluid is exhausted so that with the clutch pedal depressed and the transmission stopped, there is no pressure on the transmission or the gears and the gears can be easily and smoothly shifted. Release of the clutch pedal effects relative movement of the piston head away from the upper chamber towards the lower chamber to a predetermined degree sufficient to effect the flow of fluid through the conduit back to the upper chamber for the next actuation of the brake. A needle valve is provided in the conduit for selective adjustment of the flow therethrough.

The foregoing objects and such further objects as may appear herein, or be hereinafter pointed out, together with the advantages of this invention will be more fully discussed and developed in the more detailed description of the accompany drawings.

DESCRIPTION OF THE PREFERRED EMBODIMENT

Figure 7:
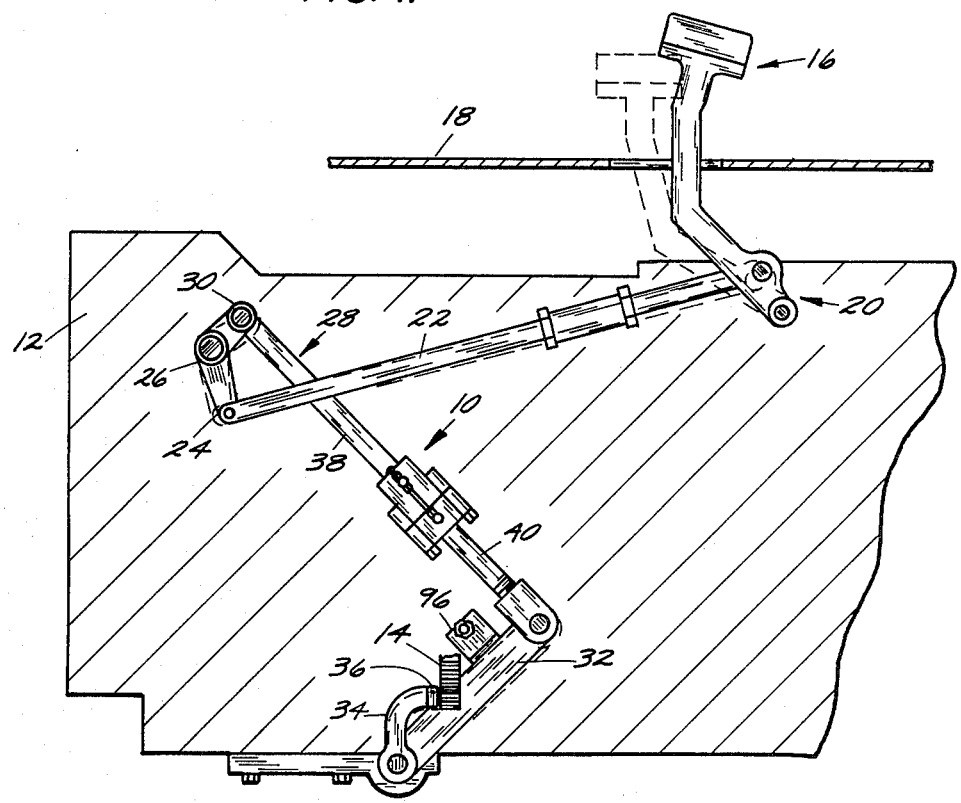
FIG. 7 is a schematic view of a clutch pedal actuated transmission brake linkage system incorporating this invention.

Referring to the drawings, the new fluid coupling device of this invention is designated generally by the numeral 10 and its use in the linkage arrangement of a typical clutch pedal actuated transmission brake system for tractors and the like is shown in the schematic representation of such a system in FIG. 7. No invention is claimed in the transmission brake system, per se, but only in device 10 as applied thereto. However, for purposes of the description and operation of device 10, such braking system is briefly described as follows.

Numeral 12 represents a tractor and 14 denotes the transmission gear wheel operably mounted thereon in a well known manner. The clutch pedal 16, extending above the floorboard 18, is pivotally connected as at 20 to tractor 12 for operational engagement with the clutch mechanism (not shown) through rod 22 that connects to one end 24 of a crank arm 26. A pivotally connected link means 28 extends from the other end 30 of crank arm 26 to pivotal connection with one end of a brake lever 32 for operation thereof and the other end of such lever 32 is operatively connected to brake member 34 having the brake pad 36 for engaging wheel 14. Conventionally, link means 28 is a rigid rod connection between crank arm 26 and brake lever 32 so that when pedal 16 is depressed and transmitting force through linkage 28 and lever 32 to wheel 14 through brake 34, such force continues against such wheel after it has stopped until pedal 16 is released and this creates the difficulties in shifting gears referred to earlier. Device 10 disposed as seen in FIG. 7 is designed to eliminate the pressure problem as noted and reference is now made more particularly to FIGS. 1–4 for a more detailed description thereof.

Figure 1:
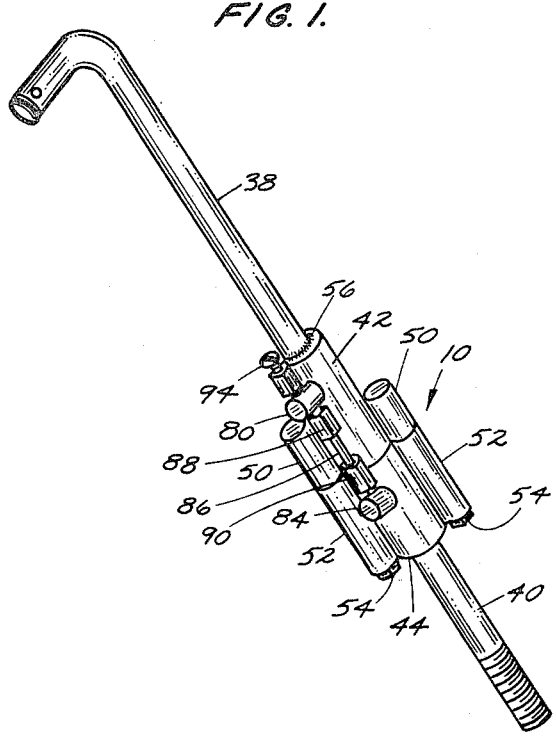
FIG. 1 is a perspective view of a fluid coupling shown mounted to the transmission brake lever operating rod according to this invention.
Figure 2:
FIG. 2 is a top plan view thereof.
Figure 3:
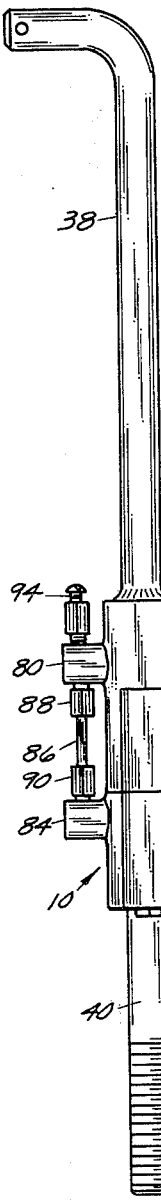
FIG. 3 is a side elevational view thereof.
Figure 4:
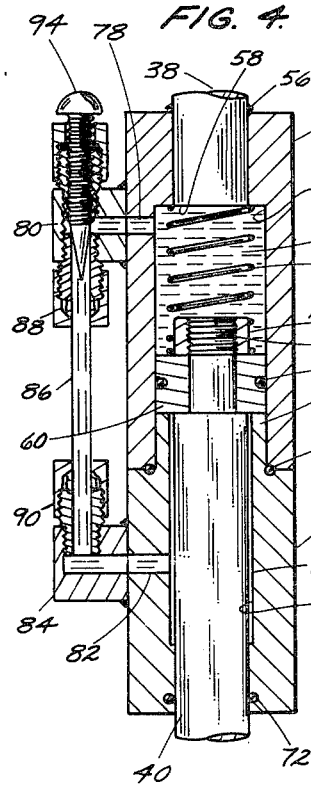
FIG. 4 is an enlarged cross sectional view taken on the line 4—4 of FIG. 2 showing the brake lever operating rod in non-operating position.
Figure 5:
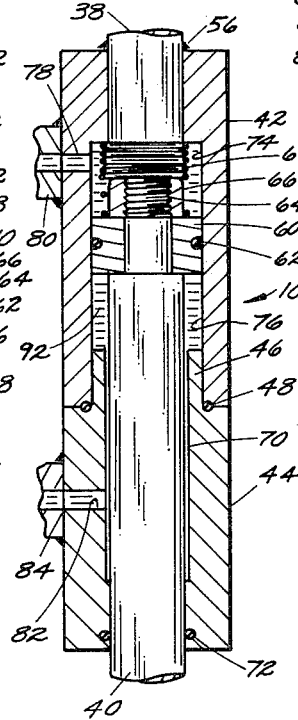
FIG. 5 is a view similar to FIG. 4 but showing the brake lever operating rod in operable position.
Figure 6:
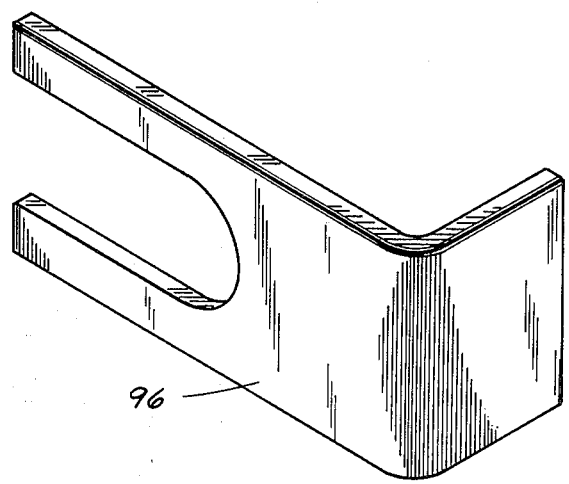
FIG. 6 is a perspective view of a brake lever stop member used with this invention.

The link means 28 which acts on brake lever 32 to operate brake 34 and which, as noted above, is conventionally a single rigid rod, is for purposes of this invention formed of two rod lengths 38, 40 longitudinally aligned and connected by coupling 10. Such coupling includes an upper cylindrical housing 42 and a lower cylindrical housing 44 for mating connection therewith with housing 44 provided with a projecting neck 46 and O-ring seal 48 for such purposes as best seen in FIGS. 4, 5. Externally on housing 42 are the spaced integral internally threaded bolt recesses 50 in registration with complementary bolt channels 52 on housing 44 so that housings 42, 44 can be releasably connected by bolts 54.

The end of rod 38 in opposed relationship to rod 40 is secured to the upper end of housing 42 in any suitable manner such as by welding 56 so that the secured end of rod 38 provides the closed upper end 58 of housing 42 as seen in FIG. 4. The end of rod 40 opposite to the end attached to brake lever 32 is slidably journalled through housing 44 and neck 46 and carries a piston head 60 with O-ring seal 62. Such end of rod 40 is threaded as at 64 so that piston head 60 can be secured by nut 66. A helical spring 68 journalled over nut 66 against the piston head 60 extends to abutment with the closed end 58 of housing 42. The bore of the lower housing 44 is slightly oversized 70 relative to rod 40 from neck 46 towards but not to the opposite end and an O-ring seal 72 is provided as shown. Thus far described, the connected housings 42, 44 form an internal chamber area wherein the piston head 60 therein divides such area into an upper chamber 74 and a lower chamber 76 with the oversized bore area 70 of housing 44 being a part of the lower chamber.

A passageway 78 through housing 42 in communication with the upper chamber 74 communicates with an integral channeled boss 80 on the exterior of such housing and a like passageway 82 on housing 44 in communication with the lower chamber 76 communicates with a like channeled boss 84 on the exterior of housing 44. Communication between the channels in bosses 80, 84 is provided by the conduit 86 that is removably attached thereto by the respective fittings 88, 90. By this arrangement, a flow channel between chambers 74, 76 for fluid 92 in coupling 10 is provided and a needle valve 94 is placed in the channel of boss 80 for regulating such flow.

OPERATION

Coupling 10 constructed as described is disposed in the clutch pedal actuated transmission brake system as shown in FIG. 7 between the crank arm 26 and the brake lever 32. In non-operating position, spring 68 will be expanded as seen in FIG. 4 urging rod 40 away from rod 38 to provide the upper chamber 74 with its largest dimension and in which the fluid supply 92, such as oil, is contained. As the clutch pedal 16 is depressed so that the rod 38 is moved by crank arm end 30 to compress spring 68 against piston head 60, the entrapped fluid 92 becomes in effect a solid connection between rods 38, 40 for transmitting force therebetween to lever 32 for operating brake 34. At the same time, as the distance between the piston head 60 and the closed end 58 of housing 42 decreases, fluid 92 under pressure flows out of chamber 74 through passageway 78, through conduit 86 and into chamber 76 by passageway 84 with the rate of flow regulated by the needle valve 94. When pedal 16 is fully depressed, the piston head 60 will reach a position in chamber 76 as seen in FIG. 5 at which point all fluid 92 will have passed into chamber 76 over a time interval calculated to correspond with the stopping of the transmission gear wheel 14 and at that time, the force transmitting connection between rods 38, 40 created by the entrapped fluid 92 is terminated by the exhaustion of the fluid supply in chamber 74 and this relieves pressure on the transmission without the necessity for releasing the clutch pedal 16. In this situation, the gears can be shifted easily and smoothly. When pedal 16 is released, a stop bar 96 mounted to the tractor 12 in any suitable manner and shown in FIG. 7, permits the brake lever 32 to move approximately 0.080 of an inch which is sufficient to return the piston head 60 to the position seen in FIG. 4 and during which movement, fluid 92 will return from chamber 76 to chamber 74 by conduit 86 in the reverse direction as described above in readiness for the actuation of brake 34. Accordingly, in view of the foregoing, it is thought a full understanding of the construction and operation of this invention will be had and the advantages of the same will be appreciated.

I claim:

1. Apparatus for transferring and terminating the transfer of force from a first member to a second member through a fluid medium, comprising:

a fluid filled coupling having respective opposite ends and secured at one end to said first member, said second member arranged for reciprocal movement at the other end of said coupling to act on said fluid, said first member adapted for actuation by a source of power and said second member adapted for connection to a third member to be operated, actuation of said first member effecting relative movement of said first and second members whereby said fluid under pressure in said coupling acts as a solid connection between said members to transmit force therebetween to said third member, means operably associated with said coupling for the removal and storage of said fluid out of operable relationship with said first and second members, and with said first member actuated, fluid is moved out of operable relationship with said first and second members to a point of storage over a determined time interval for operation of said third member whereby at the completion of such removal, the force transmitting fluid connection between said first and second members terminates by removal of the fluid from operable relationship therebetween to relieve pressure on said third member without deactuating said first member.

2. Apparatus as defined in claim 1 including means operably associated with said second member effective upon deactuation of said first member to return said fluid from the point of storage to operable relationship between said first and second members.

3. Apparatus as defined in claims 1 or 2 including means for regulating the rate of flow of said fluid out of operable relationship between said first and second members.

4. Apparatus as defined in claim 1 wherein said coupling comprises:

first and second cylindrical housings, means for releasably securing said housings in mating relationship to define a chamber area therein, said first member secured to said first housing to form a closed end for said chamber area, said second member slidably journalled in part in fluid seal engagement in said second housing into said chamber area, a piston head on said second member dividing said chamber area into an upper chamber and a lower chamber, yielding means in said upper chamber intermediate said piston head and said closed end, a supply of fluid in said upper chamber, a first fluid passageway from said upper chamber to the exterior of said first housing, a second fluid passageway from said lower chamber to the exterior of said second housing, a removable fluid conduit operably connecting said first and second fluid passageways, actuation of said first member effecting relative movement of said piston head in said upper chamber against said fluid creating a solid fluid connection for transmitting force between said first and second members during which time said fluid flows out of said upper chamber and into said lower chamber and exhaustion of the fluid supply in said upper chamber terminates the transmission of force from said first member to said second member without deactuation of said first member, and upon deactuation of said first member, said yielding means act against said piston head to move it towards said lower chamber and effect the flow of fluid therefrom to said upper chamber.

5. Apparatus as defined in claim 4 including a fluid flow regulating means in said fluid conduit.

6. In the brake system for the transmission gear wheel on a motor vehicle, said system being of the class having a brake operated by a clutch pedal actuated brake lever, an improvement in the clutch pedal actuated apparatus for operating said brake lever, comprising:

a first elongated rod operably connected at one end to said clutch pedal for longitudinal movement upon depression of said pedal, a second elongated rod operably connected at one end to said brake lever, the respective other ends of said first and second rods disposed in longitudinal spaced alignment, a fluid filled coupling having respective opposite ends, said other end of said first rod secured to one end of said coupling, said other end of said second rod slidably journalled in fluid seal engagement in said other end of said coupling for relative movement against said fluid towards said first rod, depression of said clutch pedal acting to effect relative movement of said first and second rods whereby said fluid under pressure in said coupling acts as a solid connection between said rods to transmit force therebetween to said brake lever, means on said coupling for the removal and storage of fluid out of operable relationship with said first and second rods, and with said clutch pedal depressed, said fluid is moved out of operable relationship with said rods to a point of storage over a determined time interval for stopping said transmission gear wheel whereby at the completion of such removal the force transmitting fluid connection between said rods terminates by exhaustion of said fluid supply therebetween to relieve pressure on said transmission gear wheel so that gears can be shifted easily and smoothly.

7. Apparatus as defined in claim 6 including means operatively associated with said second rod effective upon release of said clutch pedal to return said fluid from the point of storage to operably relationship with said rods.

8. Apparatus as defined in claim 6 wherein said coupling comprises:

first and second cylindrical housings, means for releasably securing said housings in mating relationship to define a chamber area therein, said other end of said first rod secured to said first housing to form a closed end for said chamber area, said other end of said second rod slidably journalled in fluid seal engagement in said second housing into said chamber area, a piston head on said other end of said second rod dividing said chamber area into an upper chamber and a lower chamber, yielding means in said upper chamber intermediate said piston head and said closed end, a supply of fluid in said upper chamber, a first fluid passageway from said upper chamber to the exterior of said first housing, a second fluid passageway from said lower chamber to the exterior of said second housing, a removable fluid conduit operably connecting said first and second fluid passageways, relative movement of said piston head in said upper chamber under actuation by depression of said clutch pedal effecting pressure on said fluid for transmitting force between said first and second rods during which time said fluid flows out of said upper chamber and into said lower chamber and exhaustion of the fluid supply in said upper chamber terminates the transmission of force from said first rod to said second rod, and upon release of said clutch pedal, said yielding means acts against said piston head to move it towards said lower chamber and effect the flow of fluid from said lower chamber to said upper chamber.

9. Apparatus as defined in claim 8 including a tractor mounted brake lever stop member for limiting the movement of said lever upon release of said clutch pedal.

10. Apparatus as defined in claim 8 including a fluid flow regulating means in said fluid conduit.

11. Apparatus as defined in claim 10 wherein said regulating means is a needle valve.

* * * * *